Figure 1:
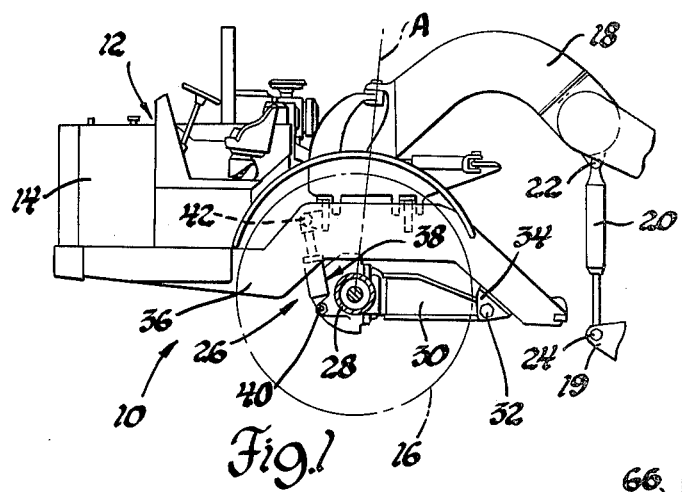

United States Patent [19]

Pelouch

[11] 4,070,035
[45] Jan. 24, 1978

[54] RIDE STRUT FOR VEHICLE SUSPENSION SYSTEM

[75] Inventor: Robert J. Pelouch, Brecksville, Ohio

[73] Assignee: General Motors Corporation, Detroit, Mich.

[21] Appl. No.: 740,957

[22] Filed: Nov. 11, 1976

[51] Int. Cl.² .......................................... B60G 11/26
[52] U.S. Cl. ................................ 280/709; 267/64 R
[58] Field of Search ...................... 280/709, 702, 6 H; 267/64 R, 64 A, 65 R

[56] References Cited

U.S. PATENT DOCUMENTS 3,527,451  9/1970  Long ................................. 267/64 R
3,844,543  10/1974  Whelan ............................. 267/64 R Primary Examiner—Philip Goodman
Attorney, Agent, or Firm—Edward J. Biskup

[57] ABSTRACT

A ride strut for a vehicle suspension system having relatively reciprocable piston and cylinder members which provide a pair of variable volume chambers and a fixed volume chamber interconnected through a pair of orifices which serve to dampen the relative movement of members. The piston member is formed with a passage that cooperates with a recess formed in the cylinder member for providing a continuous flow leveling system.

2 Claims, 3 Drawing Figures

U.S. Patent  Jan. 24, 1978  4,070,035

RIDE STRUT FOR VEHICLE SUSPENSION SYSTEM

This invention concerns vehicle suspensions in general and more particularly a ride strut of a type that provides a resilient and shock absorbing support and, in addition, serves to maintain the elevation of the suspended part of the vehicle at a predetermined distance above the ground.

In the preferred form, the ride strut according to the invention is adapted to be positioned between a vehicle frame and one wheel thereof and includes relatively movable piston and cylinder members. The piston member is formed with the usual piston head which is fixed with one end of a rod, the other end of which extends out of the open end of the cylinder member. The piston head serves to divide the cylinder member into first and second variable volume chambers which receive hydraulic fluid, and has a transverse passage formed therein that opens at the inner side wall of the cylinder member. The rod has a fixed volume chamber formed therein and a first orifice is located in the piston head for fluidly connecting the fixed volume chamber with the first variable volume chamber and for restricting fluid flow therebetween so that dampening of the strut occurs during jounce. A first port is formed in the outer end of the rod and communicates with the first variable volume chamber through the fixed volume chamber and the first orifice. The outer end of the rod is also formed with a second port which is connected directly with the passage formed in the piston head. The ride strut forms a part of a hydraulic circuit which includes a pump connected to the first port through an accumulator which is adapted to be charged by the pump and receive hydraulic fluid from the first variable volume chamber when the ride strut is contracted. The hydraulic circuit also includes a reservoir which is connected to the second port. A recess is formed in the inner side wall of the cylinder member and allows the pump and accumulator to be automatically and continuously connected to the reservoir via the recess and the passage in the piston head so to position and maintain the piston member at a predetermined point relative to the cylinder member and thereby provide leveling of the wheel. In addition, a second orifice is formed in the inner end of the rod adjacent the piston head for connecting the fixed volume chamber with the second variable volume chamber so as to restrict fluid flow therebetween during rebound and thereby provide dampening of the ride strut.

The objects of the present invention are to provide a new and improved ride strut having self-leveling, bi-directional internal dampening, and maximum stroke snubbing capabilities without any return line flow variations; to provide a new suspension cylinder having a pair of variable volume chambers and a fixed volume chamber interconnected through a pair of orifices which control fluid flow therebetween and thereby provide dampening of the cylinder; and to provide an improved ride strut having relatively reciprocable piston and cylinder members in which the piston member is formed with a passage that cooperates with a recess formed in the cylinder member for providing a continuous flow leveling system.

Figure 3:
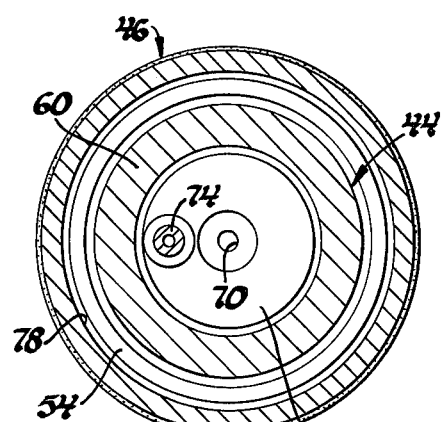
Figure 2:
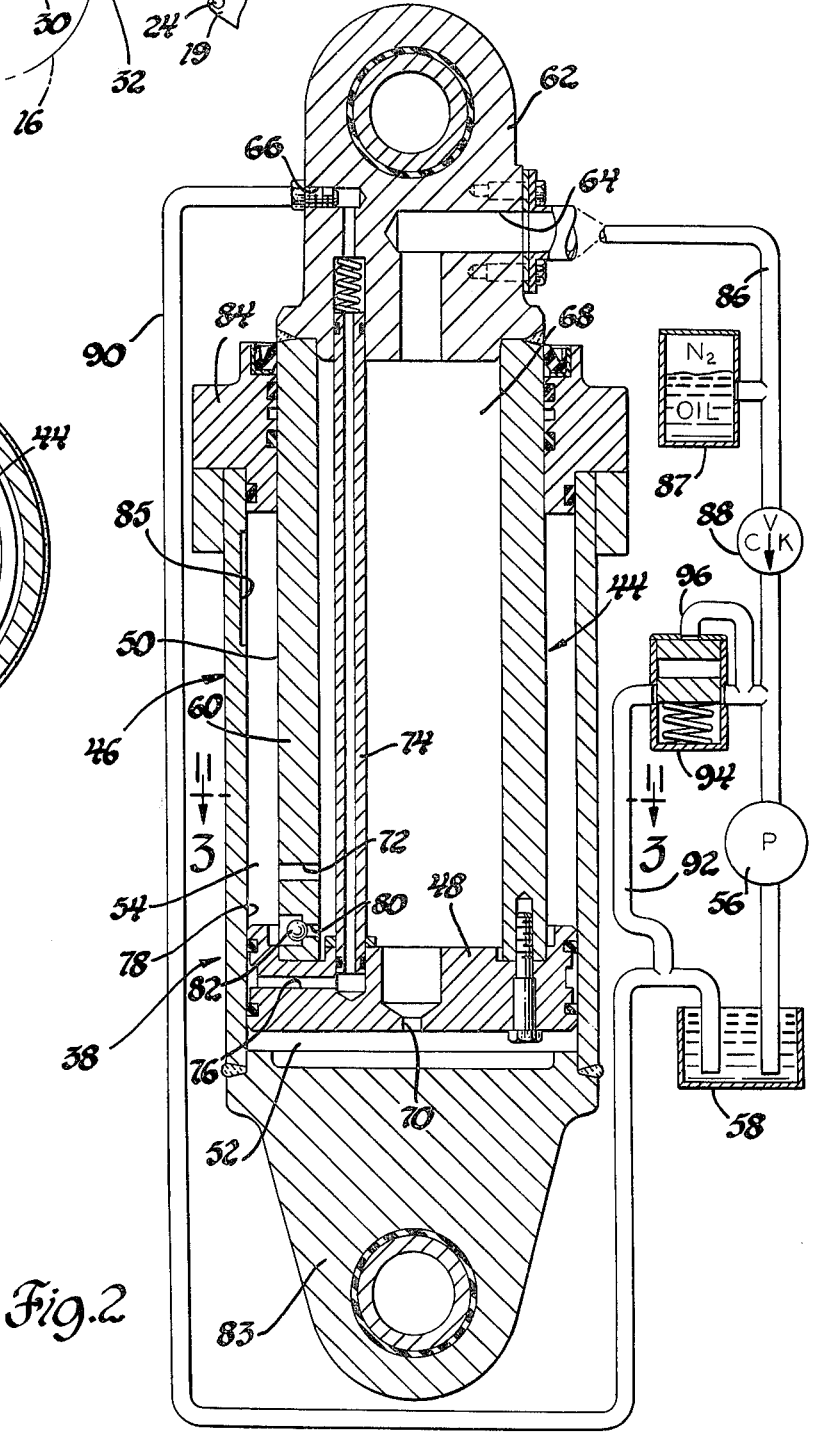

Other objects and advantages of the present invention will be more apparent from the following detailed description when taken with the drawing in which:

FIG. 1 shows an overhung tractor of a scraper provided with a suspension system incorporating a ride strut made in accordance with the invention, FIG. 2 is an enlarged sectional view showing the ride strut according to the invention and the hydraulic circuit for supplying fluid to and receiving fluid from the ride strut and, FIG. 3 is a sectional view taken on lines 3—3 of FIG. 2.

Referring now to the drawing and more particularly FIG. 1 thereof, an earthmoving, rubber-tired scraper 10 is shown comprising the usual overhung tractor 12 having an engine compartment 14 which houses the usual internal combustion engine for providing drive to the front wheels 16 of the tractor 12. The tractor 12 is connected through a conventional pull yoke 18 to a trailing scraper bowl 19, which in turn, is supported by the usual rear wheels which can be driven by a rear engine carried by the scraper bowl. Thus, a scraper is provided with the tractor 12 being steerable in the conventional manner about a vertical steer axis "A" and the scraper bowl 19 is movable between a lowered-dig position and a raised-carry position by a pair of double-acting hydraulic jacks 20, one of which is shown suspended from the pull yoke 18 at one end by a pivot connection 22 and connected by a pivot connection 24 to the forward portion of the scraper bowl 19 at the other end.

In order to improve the rideability of the scraper 10 described above, a suspension system 26 is provided for the front wheels 16 of the tractor 12. The front wheels 16 are rotatably carried by the opposed ends of a transverse front axle 28 and, in this regard, it will be noted that the axle 28 has the rear end thereof rigidly connected to the forward portion of a pair of horizontally aligned and laterally spaced leading support arms only one of which is shown and indicated by reference numeral 30. The rear portion of each leading support arm 30 is connected by a pivot joint 32 to a bracket 34 rigidly secured to the tractor frame 36. Thus, the axle 28 is capable of oscillating about a transverse horizontal axis which passes through the centers of the pivot joints 32 connecting the leading arms to the frame 36.

A front portion of the axle 28 is connected by a pair of forwardly inclined and laterally spaced hydraulic ride struts to an intermediate portion of the frame. The ride struts are made according to the invention with one strut only being visible in FIG. 1 and is identified by reference numeral 38. Each of the ride struts 38 has the base end thereof pivotally connected to the axle 28 at a point 40 while the other end is pivotally connected to the frame 36 at a point 42.

It will be understood that each of the ride struts 38 are identical in configuration and, as seen in FIG. 2, include relatively reciprocable piston and cylinder members 44 and 46, respectively. The piston member 44 includes a piston head 48 which is fixed to the inner end of a rod 50, the other end of which extends out of the open end of the cylinder member 46. The piston member 44 serves to divide the cylinder member 46 into a first variable chamber 52 and second variable volume chamber 54, each of which is adapted to receive hydraulic fluid from a pump 56 which draws fluid from a reservoir 58. More specifically, the rod 50 consists of a tubular part 60, the inner end of which is rigidly connected to the piston head 48. The outer end of the tubular part 60 is closed by an eye member 62 which is formed with a pair of ports 64 and 66. The port 64 communicates with the inner hollow portion of the tubular part 60 that forms a fixed volume chamber 68 which is connected through an orifice 70 formed in the piston head 48 with the variable volume chamber 52. An orifice 72 is also formed in the side wall of the tubular part 60 and connects the fixed volume chamber 68 with the variable volume chamber 54. It will also be noted that the port 66 is directly connected through a pipe 74 with a transverse passage 76 located in the piston head 48 which opens at the inner side wall surface 78 of the cylinder member 46. A second orifice 80 is formed in the tubular part adjacent the piston head and includes a ball check 82 so as to allow fluid to flow from the fixed volume chamber 68 to the variable volume chamber 54, but not in the opposite direction.

The cylinder member 46 has the base end thereof closed by an eye member 83 while the open end fixedly supports an annular seal retaining member 84 which provides sealing circumferential contact with the outer surface of the rod 50. Adjacent the seal retaining member 84, a recess 85 is formed in the inner side wall surface 78 of the cylinder member 46.

The ride strut 38 described above is located in a hydraulic circuit which includes the aforementioned pump 56 and reservoir 58. The pump 56 draws fluid from the reservoir 58 and supplies it to the port 64 of the strut through a conduit 86. Located in the conduit 84 between the pump 56 and the port 64, is an accumulator 87 of the usual type having a precharge of nitrogen which serves as a spring for providing resilient movement of the ride strut 38. A check valve 88 is also located in the conduit 86 between the pump 56 and the accumulator 87. The port 66 is connected through a conduit 90 to the reservoir 58. The conduit 90 includes a branch conduit 92 which is connected to the conduit 86 between the pump 56 and the check valve 88 and incorporates a relief valve 94 so that under certain conditions, the pump 56 may be connected directly to the reservoir 58.

The operation of the ride strut 38 described above is as follows. When the tractor 12 is traveling along a smooth surface, the ride strut 38 will maintain the axle 28 at a predetermined position relative to the frame 36. This is realized through the self-leveling arrangement provided by the ride strut 38 and the hydraulic circuit connected thereto. Thus, as seen in FIG. 2, the pump 56 will normally supply pressurized fluid at a predetermined pressure to the variable volume chamber 52. In this regard and with the piston and cylinder members positioned as shown in FIG. 2, initially the pressurized fluid will enter the fixed volume chamber 68 via the port 64 and flow through the orifice 70 to the variable volume chamber 52. At the same time, some fluid will flow through the orifices 72 and 80 into the variable volume chamber 54. As the piston head 48 moves away from the base end of the cylinder member 46, the vehicle frame 36 moves upwardly until the passage 76 in the piston head 48 is fluidly connected to the recess 85 formed in the inner side wall surface 78 of the cylinder member. At this point, the variable volume chamber 52 is connected with the passage 76 through the recess 85 and the fluid flows through the passage 76 to the port 66 and via the conduit 90 to reservoir 58. Fluid flow is continuous in this manner and thereby maintains the distance between the axle 28 and the frame 36 of the tractor at a predetermined desired amount. If the wheel of the tractor 12 then encounters a boulder or the like, the strut 38 will be compressed causing the cylinder member 46 to move upwardly as seen in FIG. 2 relative to the piston member 44 so as to cause the fluid in the variable volume chamber to flow through the orifice 70 into the fixed volume chamber 68. Some of the fluid in the fixed volume chamber 68 will be used as makeup fluid and flow through the orifices 72 and 80 into the variable volume chamber 54. At the same time, the fluid will flow into the accumulator 87 so that the latter cushions the compressive movement of the strut 38. The check valve 88 at such time can close and the pump 56 acting through the branch conduit 96 will cause the valve member in relief valve 94 to be moved into position so as to connect the pump 56 directly with the reservoir 58 via conduit 92. If, on the other hand, the wheel of the tractor 12 should drop into a hole causing extension of the ride strut 38, the fluid in the variable volume chamber 54 will flow through the orifice 72 into the fixed volume chamber 68 and again such movement will be cushioned by the accumulator 87. Expanding movement of the strut 38 will be limited when the orifice 72 is blocked by the seal retaining member 84 of the cylinder member so as to provide a snubbing action and thereby prevent any damage to the ride strut.

From the above description, it should be apparent that a ride strut 38 is provided that serves as a resilient support and has a plurality of orifices formed therein for restricting fluid flow movement between chambers and thereby providing a dampening affect. In addition, the ride strut 38 incorporates self-leveling capabilities and prevents undue extension of the piston member 44 relative to the cylinder member 46 through the snubbing action explained hereinbefore.

Various changes and modifications can be made in this construction without departing from the spirit of the invention. Such changes and modifications are contemplated by the inventor and he does not wish to be limited except by the scope of the appended claims.

I claim:

1. A ride strut for a vehicle having a frame and at least one wheel rotatably suspended therefrom, said ride strut adapted to be positioned between the frame and the wheel, said ride strut including relatively movable piston and cylinder members, said piston member comprising a piston head fixed with a rod that extends out of one end of said cylinder member, said piston member dividing said cylinder into first and second variable volume chambers for hydraulic fluid, said piston head having a passage formed therein that opens at the inner side wall of the cylinder member, said rod having a fixed volume chamber formed therein, a first orifice in said piston head for fluidly connecting said fixed volume chamber with said first variable volume chamber, a first port in the outer end of said rod communicating with said first variable volume chamber through said fixed volume chamber and said first orifice, a second port in the outer end of said rod communicating with said passage formed in said piston head, a hydraulic circuit for supplying pressurized hydraulic fluid to said ride strut, and circuit including a pump connected to said first port, an accumulator located between said pump and said first port and adapted to be charged by said pump and receive hydraulic fluid from said first variable volume chamber when said ride strut is compressed, a reservoir connected to said second port, a recess formed in the inner side wall of said cylinder member whereby said pump and accumulator are adapted to be connected to the reservoir via said recess and said passage in the piston head so as to position and maintain the piston member at a predetermined point relative to the cylinder member and thereby provide leveling of the wheel, and a second orifice formed in the inner end of said rod adjacent the piston head for connecting the fixed volume chamber with the second variable volume chamber so as to restrict fluid flow therebetween during rebound and thereby provide dampening of the ride strut.

2. A ride strut for a vehicle having a frame and at least one wheel rotatably suspended therefrom, said ride strut adapted to be positioned between the frame and the wheel, said ride strut including relatively movable piston and cylinder members, said piston member comprising a piston head fixed with a rod that extends out of one end of said cylinder member, said piston head dividing said cylinder into first and second variable volume chambers and having a transverse passage formed therein that opens at the inner side wall of the cylinder member, said rod having a fixed volume chamber formed therein, a first orifice in said piston head for fluidly connecting said fixed volume chamber with said first variable volume chamber, a first port in the outer end of said rod communicating with said first variable volume chamber through said fixed volume chamber and said first orifice, a second port in the outer end of said rod communicating with said passage formed in said piston head, a hydraulic circuit for supplying pressurized hydraulic fluid to said ride strut, said circuit including a pump connected to said first port, an accumulator located between said pump and said first port and adapted to be charged by said pump and receive hydraulic fluid from said first variable volume chamber when said ride strut is compressed, a reservoir connected to said second port, a recess formed in the inner side wall of said cylinder member whereby said pump and accumulator are adapted to be connected to the reservoir via said recess and said passage in the piston head so as to position and maintain the piston member at a predetermined point relative to the cylinder member and thereby provide automatic leveling of the wheel, a second orifice formed in the inner end of said rod adjacent the piston head for connecting the fixed volume chamber with the second variable volume chamber so as to restrict fluid flow therebetween during rebound and thereby provide dampening of the ride strut, and said second cylinder member having means formed therewith whereby extension of said piston member relative to said cylinder member beyond a predetermined point causes said second orifice to be gradually closed so as to provide a snubbing effect.

* * * * *